United States Patent
Bhate et al.

(10) Patent No.: US 12,131,501 B2
(45) Date of Patent: Oct. 29, 2024

(54) SYSTEM AND METHOD FOR AUTOMATED ESTIMATION OF 3D ORIENTATION OF A PHYSICAL ASSET

(71) Applicant: Infosys Limited, Bangalore (IN)

(72) Inventors: Ujwal Bhate, Pune (IN); Ninad Jayant Kulkarni, Mumbai (IN); Mohammedshadab Mohammedaslam Shaikh, Ahmedabad (IN); Arnab Chakravarty, Kolkata (IN); Pratyush Choubey, Sagar (IN); Neeraj Kumar Gulia, Sonipat (IN); Jigar Sanjay Shah, Hubli (IN)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 17/394,175

(22) Filed: Aug. 4, 2021

(65) Prior Publication Data
US 2022/0309708 A1     Sep. 29, 2022

(30) Foreign Application Priority Data
Mar. 29, 2021  (IN) .............................. 202141014008

(51) Int. Cl.
| | |
|---|---|
| *G06T 7/73* | (2017.01) |
| *G06N 3/045* | (2023.01) |
| *G06T 7/11* | (2017.01) |
| *G06T 7/20* | (2017.01) |
| *G06T 17/20* | (2006.01) |

(52) U.S. Cl.
CPC ............... *G06T 7/75* (2017.01); *G06N 3/045* (2023.01); *G06T 7/11* (2017.01); *G06T 7/20* (2013.01); *G06T 17/20* (2013.01); *G06T 2207/20084* (2013.01); *G06T 2207/30184* (2013.01)

(58) Field of Classification Search
CPC .... G06T 7/70; G06T 7/73; G06T 7/75; G06T 17/00; G06T 17/20; G06T 2207/20084; G06T 2207/30184; G06N 3/02; G06N 3/0454
See application file for complete search history.

(56) References Cited

U.S. PATENT DOCUMENTS

| | | | |
|---|---|---|---|
| 9,275,308 | B2 | 3/2016 | Szegedy et al. |
| 9,881,416 | B2 | 1/2018 | Priest |
| 11,335,077 | B1 * | 5/2022 | Salmani Rahimi ..... G06T 17/20 |
| 2014/0336928 | A1 | 11/2014 | Scott |
| 2017/0024929 | A1 * | 1/2017 | Priest .................... B64C 39/024 |
| 2017/0206648 | A1 * | 7/2017 | Marra .................... G01C 21/20 |

(Continued)

*Primary Examiner* — Diane M Wills
(74) *Attorney, Agent, or Firm* — Finnegan, Henderson, Farabow, Garrett & Dunner LLP

(57) ABSTRACT

A method and/or system for automated estimation of 3D orientation of a physical asset using deep learning models and computer vision algorithms, according to one or more embodiments. The system may be configured to receive images of the physical asset and camera orientation data as input, use deep learning neural network models to isolate the physical assets across the images, track each physical asset instance throughout the images and derive a 3D point cloud model of each asset by projecting binary masks of the asset contours from different view-points. The 3D point cloud model is further processed and supplemented with camera orientation data to estimate the 3D orientation of one or more assets present in the images.

15 Claims, 10 Drawing Sheets

(56) References Cited

U.S. PATENT DOCUMENTS

| | | | |
|---|---|---|---|
| 2018/0218214 A1* | 8/2018 | Pestun | G06V 20/188 |
| 2020/0234466 A1* | 7/2020 | Holzer | G06T 7/75 |
| 2022/0004740 A1* | 1/2022 | Piccoli | G06T 15/04 |
| 2022/0366651 A1* | 11/2022 | Grancharov | G06T 19/00 |

* cited by examiner

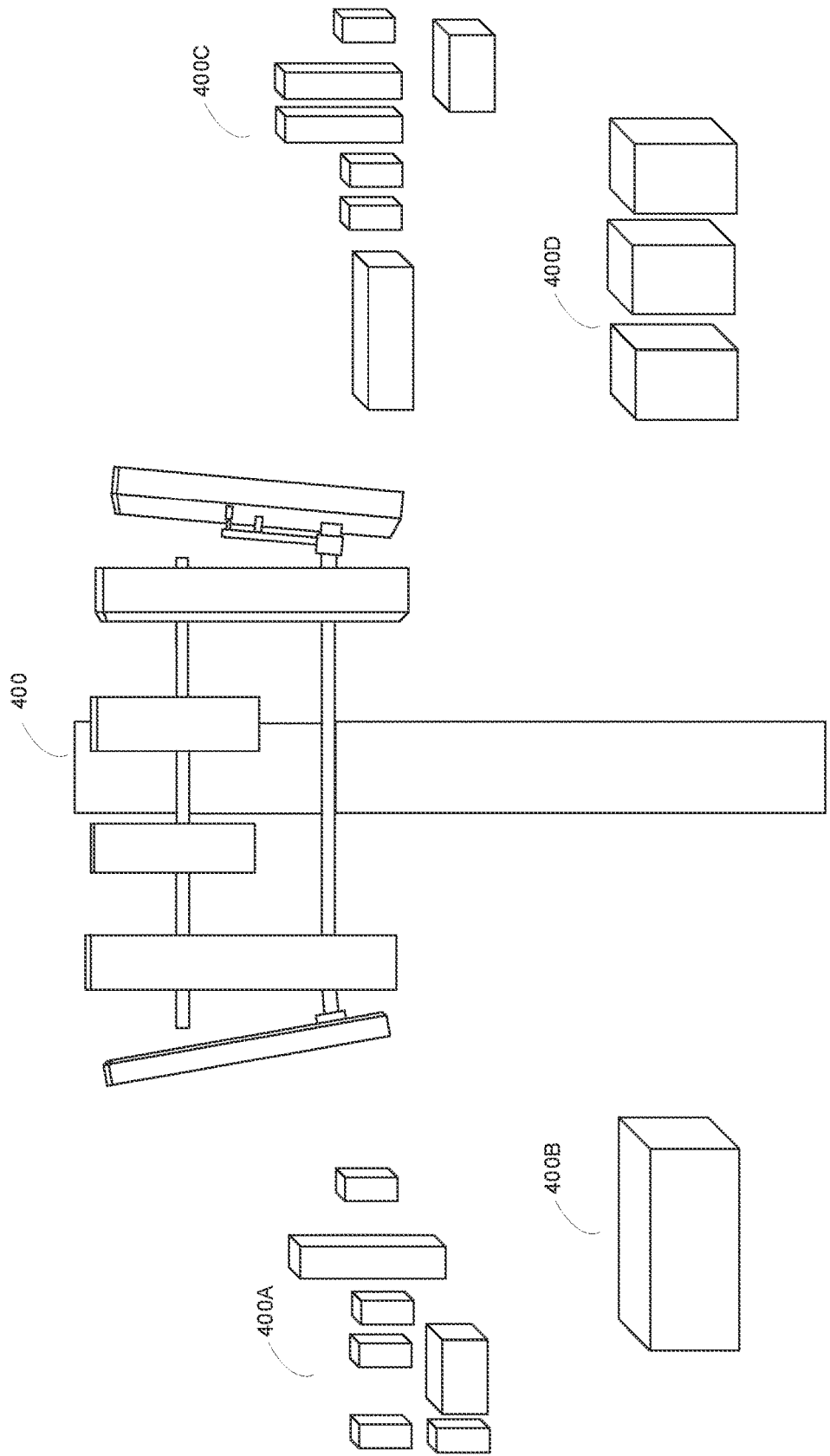

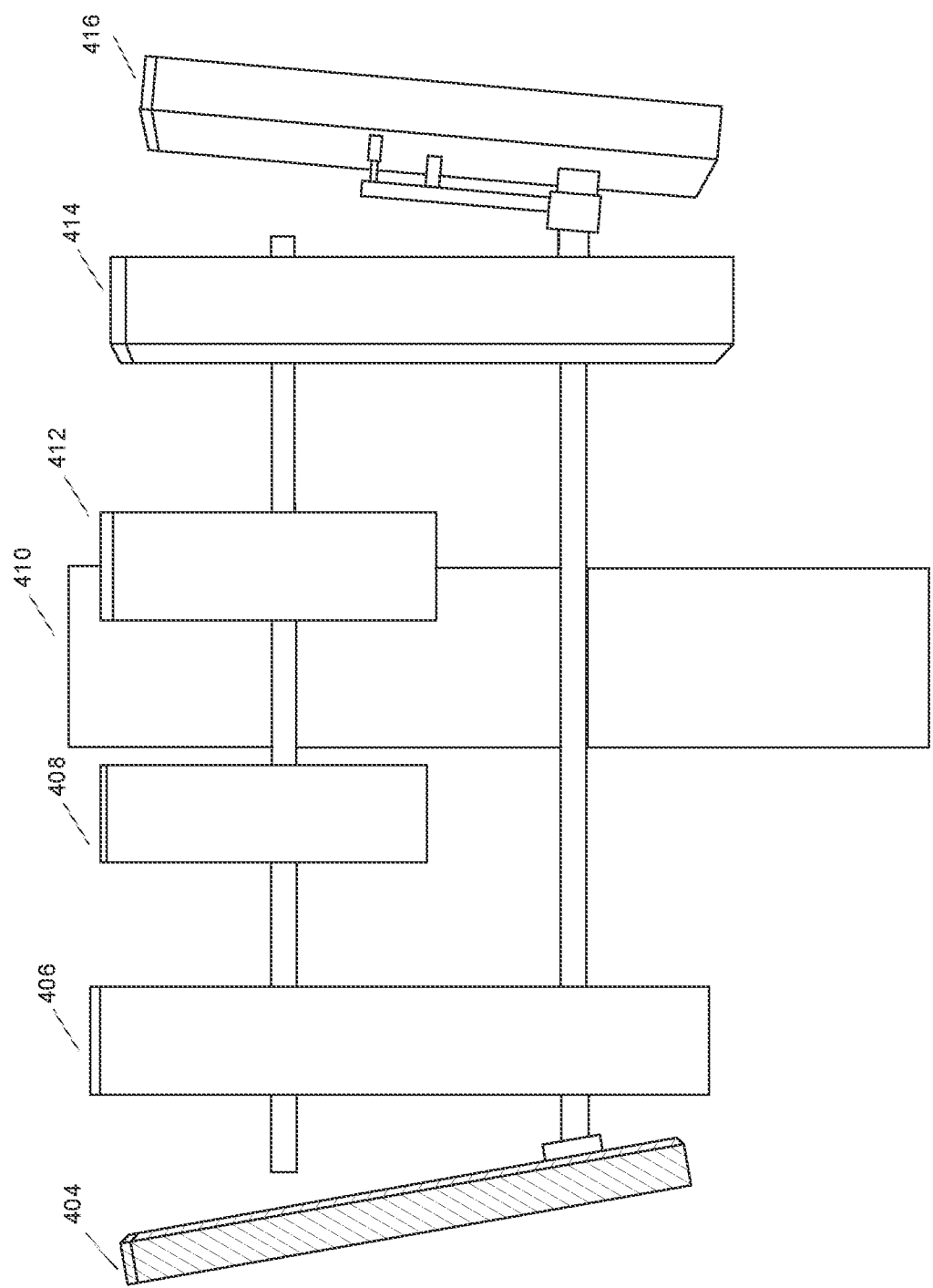

SYSTEM AND METHOD FOR AUTOMATED ESTIMATION OF 3D ORIENTATION OF A PHYSICAL ASSET

This application claims the benefit of Indian Patent Application Serial No. 202141014008, filed Mar. 29, 2021, which is hereby incorporated by reference in its entirety.

FIELD

The present technique relates to structural asset inspection. More specifically, the technique relates to automated estimation orientation of a structural asset through 3D modelling using images of the structural asset.

BACKGROUND

With a tremendous growth in technology in modern times and with an intention of man to connect to the most remote places on earth, there has been immense effort to reach remote places and build infrastructures such as communication network, providing electricity by establishing solar panels and wind turbines in remote areas etc. With development in civil engineering space, it has been possible to reach greater altitudes with high rise building, installation of hardware components at higher altitudes. For certain assets, it is important to know their orientation such as trusses, tower structures, chimneys, telecom tower antenna, solar panels, wind turbine, etc. The orientation of such structures is a critical part for their operation and thus it is necessary to periodically measure the orientation, ensure compliance and take corrective steps whenever necessary.

Field-Operation engineers sometimes manually measure the dimensions and orientation of an asset using handheld laser devices and digital compasses. Such compasses might be susceptible to magnetic inference if the measurement is performed near an asset in active use or might have lower accuracy if the measurement is made from distance. An additional challenge in manual inspection is the lack of accessibility as assets such as telecommunication antenna are mounted on top of high-rise towers thus entailing additional cost in terms of time, effort, and risk.

An alternative approach is to fly a drone around the object(s) of interest and capture numerous images from varying views. The captured images are then manually analyzed by trained operators or Subject-Matter Experts (SMEs) using special software packages to estimate the 3D orientation of the object. This requires repeated manual effort to derive meaningful information from the set of images. Further, in case of multiple objects within the same image set, the operator must manually handle complex cases of object occlusion and tracking the position of each object in order to converge on the optimal set of measurements of the 3D orientation for each object(s).

Some products offer the functionality to ingest several dozen images of an object captured from various views and then generate a 3D model using Structure from Motion (SfM) algorithms. Such a 3D model still needs to be manually analyzed to ascertain the 3D pose of the object. It must be further noted that often objects may have plain or reflective surfaces, such as solar panels. In such scenarios, the afore-mentioned 3D modelling approach can be challenging and can lead to a loss of accuracy in the model which directly results in an incorrect estimation of the 3D orientation.

Certain cameras, along with RGB cameras are also available to provide depth images. These cameras can be used to generate a 3D point cloud of the object which can be analyzed to derive the orientation estimate. However, the accuracy of these models is impacted by partial occlusions. They also require extra sensors for depth measurement and are more expensive than typical RGB cameras. Hence, there is a need of an efficient system which can address the above-mentioned problems.

SUMMARY

Presently, any automated process for extracting the asset point cloud is computationally expensive given that it must run on 3D data. There is an additional difficulty given that Structure from Motion (SfM) models do not accurately map large planar surfaces without distinct features. Also, SfM models generate sparse point clouds which need post-processing to densify. In contrast, the present invention is capable to generate the point cloud of a particular asset and not the entire scene in the input image of the physical asset.

Disclosed are a system, a method and/or non-transitory computer readable storage medium for automated estimation of 3D orientation of a physical asset using deep learning models and computer vision algorithms, according to one or more embodiments. The system may be configured to receive a video or plurality of images of the physical asset and camera orientation information as input, use deep learning neural network models to isolate the physical assets across the video or plurality of images, track each physical asset instance throughout the video or plurality of images and derive a 3D point cloud of each asset by projecting binary masks of the asset contours from different viewpoints. The present technique eliminates user/human intervention in asset extraction or measurement. The 3D point cloud is further processed and supplemented with camera orientation data to estimate the 3D orientation of one or more assets present in the video or plurality of images.

In one aspect, a computer implemented method for automated estimation of 3D orientation of a physical asset is disclosed. The method comprising, receiving plurality of images of a physical asset captured from multiple view angles using an image capturing device and sensor data of image capturing device associated with the plurality of images. The sensor data may comprise at least one or combination of position data and orientation data of the image capturing device that are associated with the plurality of images during image capture. One or more image patches is extracted from the plurality of images by identifying at least one region of interest from each of the plurality of images using a first neural network model. The first neural network model may be a trained object detection model. Pixel level boundaries of the physical asset is determined in the extracted one or more image patches and one or more segmentation masks for the determined pixel level boundaries are generated using a second neural network model. The second neural network model may be a trained object segmentation model. The extracted pixel level boundaries may represent the physical asset in the plurality of images.

The generated one or more segmentation masks of the physical asset are tracked across the plurality of images. A 3-dimensional model of the physical asset is composed by projecting the tracked one or more segmentation masks of the physical asset to a virtual central axis. The direction of projecting each of the tracked one or more segmentation masks of the physical asset is determined based on the sensor data. A 3-dimensional mesh object of the physical asset is generated based on the projection and then the generated 3-dimensions mesh is populated with dense 3-dimensional points within the boundaries, to compose a 3-dimensional model of the physical asset. The orientation of the physical asset is determined by computing cardinal axis of the 3-dimensional model. The determined orientation is either or combination of inclination (down-tilt) of the physical asset and azimuth of the physical asset.

In another aspect, a system for automated estimation of 3D orientation of a physical asset is disclosed. The system comprising one or more components, but not limited to a processor, at least one client device, a memory unit operatively coupled to the processor, wherein the processor is configured to receive plurality of images of a physical asset captured from multiple view angles using an image capturing device and sensor data of image capturing device associated with the plurality of images. The sensor data may comprise at least one or combination of position data and orientation data of the image capturing device that are associated with the plurality of images during image capture. One or more image patches is extracted from the plurality of images by identifying at least one region of interest from each of the plurality of images using a first neural network model. The first neural network model may be a trained object detection model. Pixel level boundaries of the physical asset is determined in the extracted one or more image patches and one or more segmentation masks for the determined pixel level boundaries are generated using a second neural network model. The second neural network model may be a trained object segmentation model. The extracted pixel level boundaries may represent the physical asset in the plurality of images.

The processor is configured to track the generated one or more segmentation masks of the physical asset across the plurality of images. A 3-dimensional model of the physical asset is composed by projecting the tracked one or more segmentation masks of the physical asset to a virtual central axis. The direction of projecting each of the tracked one or more segmentation masks of the physical asset is determined based on the sensor data. A 3-dimensional mesh object of the physical asset is generated based on the projection and then the generated 3-dimensional mesh object is populated with dense 3-dimensional points within the boundaries, to compose a 3-dimensional model of the physical asset. The orientation of the physical asset is determined by computing cardinal axis of the 3-dimensional model. The determined orientation is either or combination of inclination (down-tilt) of the physical asset and azimuth of the physical asset.

In yet another aspect, a non-transitory computer readable storage medium for automated estimation of 3D orientation of a physical asset is disclosed. The non-transitory compute readable storage medium comprising machine executable code which when executed by at least one processor, causes the at least one processor to perform steps such as, receiving plurality of images of a physical asset captured from multiple view angles using an image capturing device and sensor data of image capturing device associated with the plurality of images. The sensor data may comprise at least one or combination of position data and orientation data of the image capturing device that are associated with the plurality of images during image capture. One or more image patches is extracted from the plurality of images by identifying at least one region of interest from each of the plurality of images using a first neural network model. The first neural network model may be a trained object detection model. Pixel level boundaries of the physical asset is determined in the extracted one or more image patches and one or more segmentation masks for the determined pixel level boundaries are generated using a second neural network model. The second neural network model may be a trained object segmentation model. The extracted pixel level boundaries may represent the physical asset in the plurality of images.

The generated one or more segmentation masks of the physical asset is tracked across the plurality of images. A 3-dimensional model of the physical asset is composed by projecting the tracked one or more segmentation masks of the physical asset to a virtual central axis. The direction of projecting each of the tracked one or more segmentation masks of the physical asset is determined based on the sensor data. A 3-dimensional mesh object of the physical asset is generated based on the projection and then the generated 3-dimensional mesh object is populated with dense 3-dimensional points within the boundaries, to compose a 3-dimensional model of the physical asset. The orientation of the physical asset is determined by computing cardinal axis of the 3-dimensional model. The determined orientation is either or combination of inclination (down-tilt) of the physical asset and azimuth of the physical asset.

The system, the method, and/or the non-transitory computer readable storage medium disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 4 is an input image of physical asset to be inspected along with the surrounding structures, according to one or more embodiments.

FIG. 4B illustrates binary mask output of the object segmentation engine, according to one or more embodiments.

Other features of the present embodiments will be apparent from the accompanying drawings and from the detailed description that follows.

DETAILED DESCRIPTION

The objective of invention in the present disclosure is to overcome the technical problem mentioned in the background section through a system for automated estimation of 3D orientation of a physical asset, as described in various embodiments of the present technique.

In one or more embodiments, a system, a computer implemented method and/or computer readable storage medium for automated estimation of 3D orientation of a physical asset is disclosed. The method comprising, receiving plurality of images of a physical asset captured from multiple view angles using an image capturing device and sensor data of image capturing device associated with the plurality of images. One or more image patches may be extracted from the plurality of images by identifying at least one region of interest from each of the plurality of images using a first neural network model. The first neural network model may be a trained object detection model. Pixel level boundaries of the physical asset may be determined in the extracted one or more image patches and one or more segmentation masks for the determined pixel level boundaries may be generated using a second neural network model. The second neural network model may be a trained object segmentation model. The extracted pixel level boundaries may represent the physical asset in the plurality of images.

The generated one or more segmentation masks of the physical asset are tracked across the plurality of images. A 3-dimensional model of the physical asset is composed by projecting the tracked one or more segmentation masks of the physical asset to a virtual central axis. The direction of projecting each of the tracked one or more segmentation masks of the physical asset is determined based on the sensor data. The sensor data may comprise at least one or combination of position data and orientation data of the image capturing device that are associated with the plurality of images during image capture. A 3-dimensional mesh object of the physical asset is generated based on the projection and then the generated 3-dimensional mesh object is populated with dense 3-dimensional points within the boundaries, to compose a 3-dimensional model of the physical asset. The orientation of the physical asset is determined by computing cardinal axis of the 3-dimensional model. The determined orientation is either or combination of inclination of the physical asset and azimuth of the physical asset.

Figure 1:
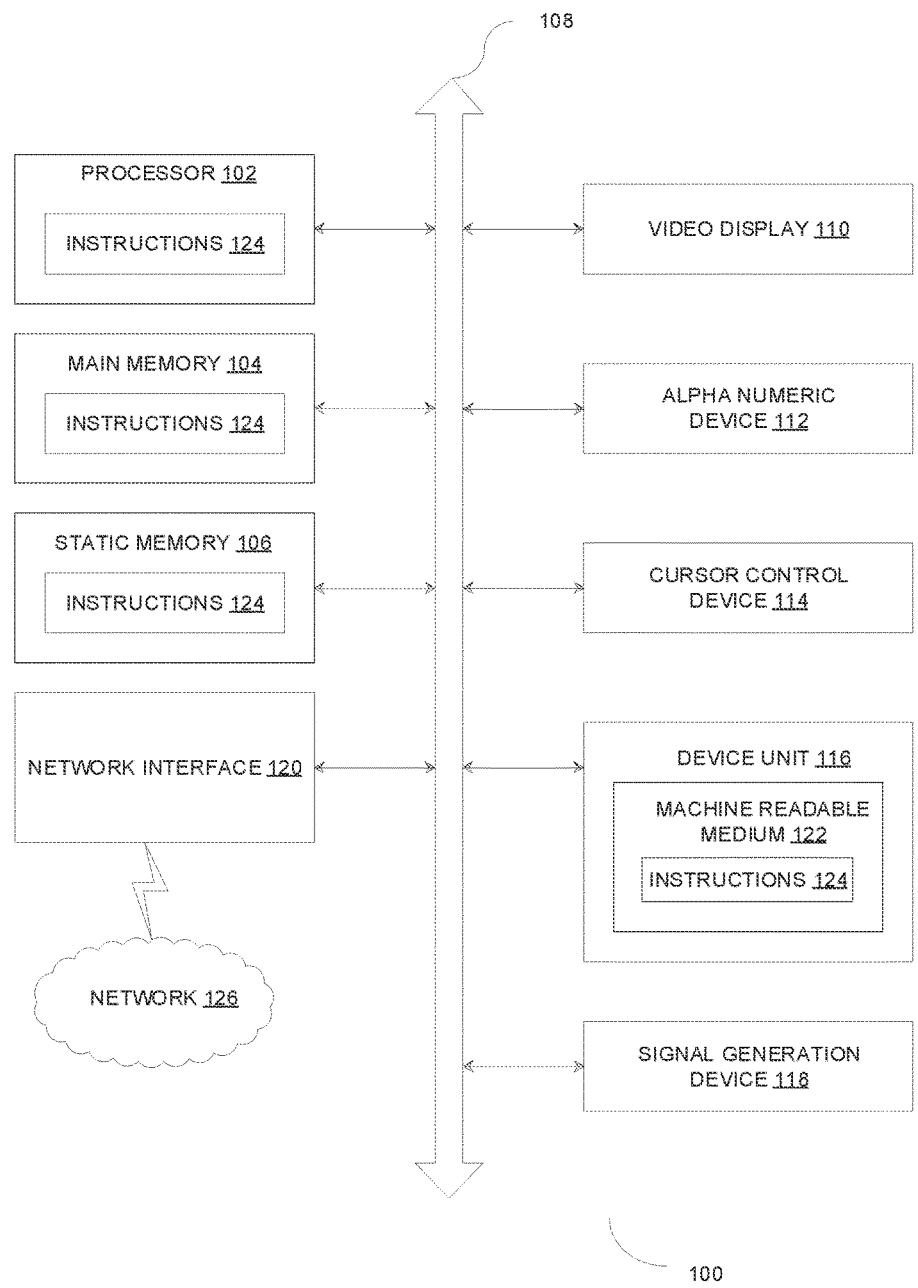
FIG. 1 is a diagrammatic representation of a data processing system capable of processing a set of instructions to perform any one or more of the methodologies herein, according to one or more embodiments.

FIG. 1 is a diagrammatic representation of a machine and/or data processing device capable of processing a set of instructions to perform any one or more of the methodologies herein, according to one embodiment. The machine and/or the data processing device in the example form, comprises a computer system 100 within which a set of instructions, for causing the machine to perform any one or more of the methodologies discussed herein, may be executed. In various embodiments, the machine operates as a standalone device and/or may be connected (e.g., networked) to other machines.

A machine may be a personal computer (PC), laptop or an embedded system and/or any machine capable of executing a set of instructions (sequential or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 100 includes a processor 102 (e.g., a central processing unit (CPU) a graphics processing unit (GPU) and/or both), a main memory 104 and a static memory 106, which communicate with each other via a bus 108. The computer system 100 may further include a video display unit 110 (e.g., a liquid crystal displays (LCD) and/or a cathode ray tube (CRT)). The computer system 100 also includes an alphanumeric input device 112 (e.g., a keyboard), a cursor control device 114 (e.g., a mouse), a disk drive unit 116, a signal generation device 118 (e.g., a speaker), and a network interface 120.

The disk drive unit 116 includes a machine-readable medium 122 on which is stored one or more sets of instructions 124 (e.g., software) embodying any one or more of the methodologies and/or functions described herein. The instructions 124 may also reside, completely and/or at least partially, within the main memory 104, within the static memory 106 and/or within the processor 102 during execution thereof by the computer system 100, the main memory 104 and the processor 102 also constituting machine-readable media.

The instructions 124 may further be transmitted and/or received over a network 126 via the network interface 120. While the machine-readable medium 122 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical media and magnetic media.

Figure 2:
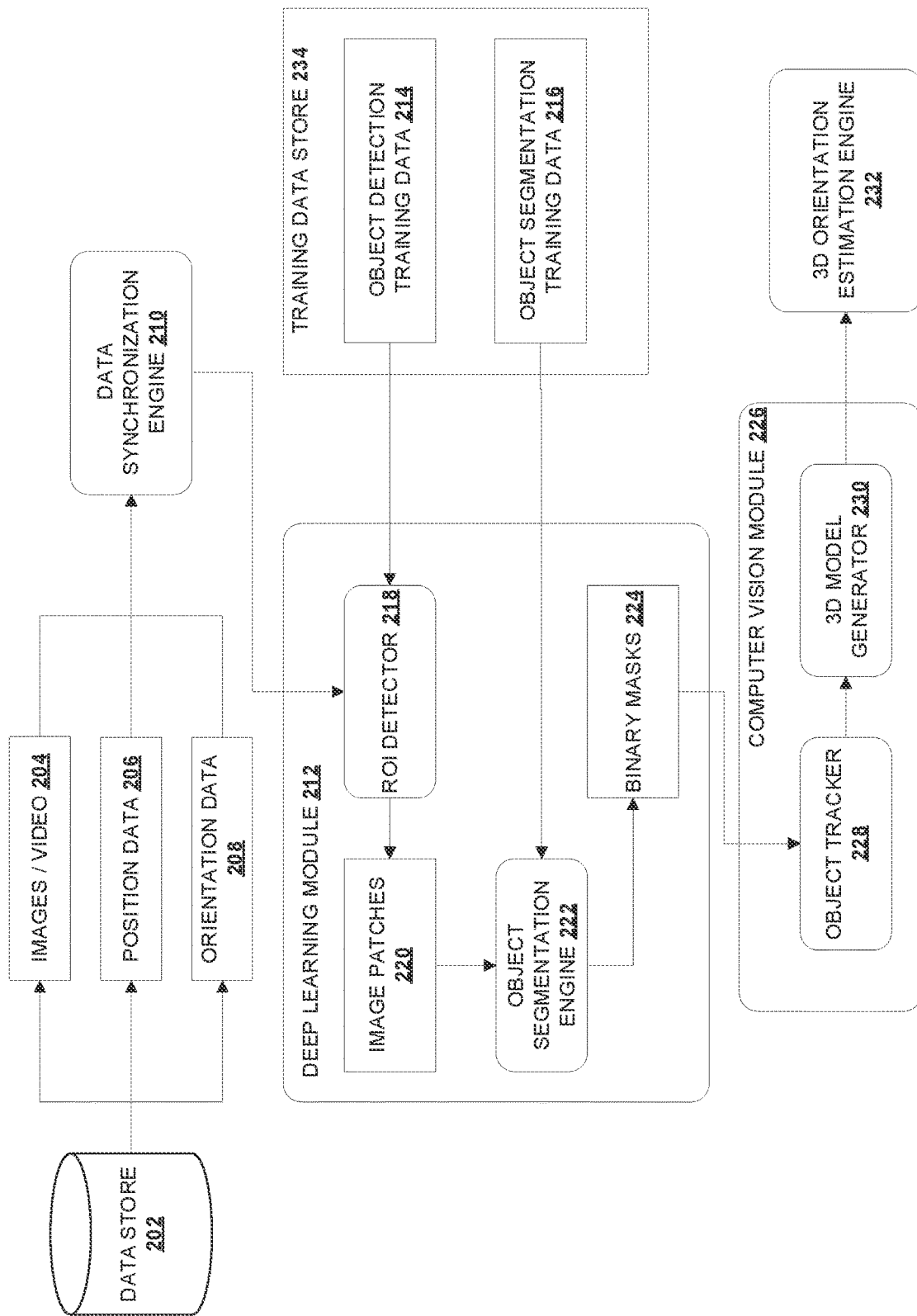
FIG. 2 is an architecture diagram illustrating plurality of components of the system for automated estimation of 3D orientation of a physical asset, according to one or more embodiments.

FIG. 2 is an architecture diagram illustrating plurality of components of the system for automated estimation of 3D orientation of a physical asset, according to one or more embodiments. In one or more embodiments, the system may comprise one or more components, but not limited to a data store 202, a data synchronization engine 210, a deep learning module 212, a computer vision module 226 and 3D orientation estimation engine 232. The deep learning module 212 may comprise one or more components such as, but not limited to a ROI detector 218 and an object segmentation engine 222. The ROI detector 218 may be a deep learning neural network model that is trained using object detection training data 214 and may be configured to generate one or more image patches 220. The object segmentation engine 222 may be a deep learning neural network model that is trained using object segmentation training data 216 and may be configured to generate binary masks 224. The computer vision module 226 may comprise one or more components, but not limited to an object tracker 228 and 3D model generator 230.

In one or more embodiments, the data store 202 may be configured to store plurality of images 204 or video 204 of the physical asset, position data 206, orientation data 208 of the image capturing device or the Unmanned Aerial Vehicle (UAV). The plurality of images 204 may be of the physical asset whose 3D orientation needs to be determined through 3D modelling as described in the present technique. The plurality of images 204 may be captured using an image capturing device. The image capturing device may be flown around the physical asset using an Unmanned Aerial Vehicle (UAV) to capture plurality of images from multiple view angles. The multiple view angles during the image capture may cover all the sides of the physical asset from all possible directions/viewpoints. In another embodiment, a video may be captured through a video capturing device which may be flown around the physical asset using the UAV to video from multiple view angles. In case of the video, the video may be converted to plurality of images by extracting image frames from the video using techniques that is well known in the art of image extraction and digital processing. The plurality of images may be of format, but not limited to JPG, JPEG, bitmap and/or PNG. The captured plurality of images 204 or the video 204 may be stored in the data store 202 for further processing which will be described in subsequent paragraphs of the present disclosure.

In one or more embodiments, the image capturing device or the video capturing device may be flown around the physical asset using an Unmanned Aerial Vehicle (UAV). The position data 206 and the orientation data 208 may be obtained either from sensors associated with the image capturing device or sensors of the UAV or the combination thereof. The position data 206 may indicate the geographical location information of either or both the image capturing device and UAV during the image capture which may be measured in terms of two co-ordinates—latitudes and longitudes. The orientation data 208 may be an Inertial Measurement Unit (IMU) data associated with the UAV. The IMU is an electronic device associated with the UAV that measures and reports orientation data 208 of the UAV, using a combination of accelerometers, gyroscopes, and sometimes magnetometers. The IMU data may comprise values of yaw angle, pitch angle and roll angle of the UAV during the fly around the physical asset. The orientation data 208 may indicate the direction from which the images are taken around the physical asset. The position data 206 and orientation data 208 may be stored along with the plurality of images either by associating with EXIF/metadata of the respective images or may be stored as a mapping information in the data store 202. The mapping information may indicate what was the position and orientation of the UAV while capturing each of the plurality of images.

In one or more embodiments, the data synchronization engine 210 may be configured to receive inputs such as, but not limited to plurality of images 204 or video 204, the position data 206 and the orientation data 208. If the plurality of images 204 are received from the data store 202, and if the position data 206 and the orientation data are associated as of EXIF/metadata of each of the plurality of images, the data synchronization engine 210 may be configured to access the position data 206 and orientation data 208 from EXIF/metadata of each of the plurality of images. If the plurality of images 204 are received from the data store 202, and if the position data 206 and orientation data 208 are stored as mapping data, the data synchronization engine 210 may be configured to access the mapping data and tag each of the plurality of images with respective position data 206 and orientation data 208 based on the mapping data accessed from the datastore 202. If the video 204 of the physical asset is accessed from the data store 202, the data synchronization engine 210 may be configured to generate plurality of images 204 of the physical asset by extracting image frames from the video 204.

The data synchronization engine 210 may collate received input by considering the difference in frequency of data capture for sensors of the image capturing device and UAV so that a valid instance of position data 206 and orientation data 208 is correlated to each of the plurality of images 204. If the frequency of data capture for sensors is lower than that of the image capturing device, then the most recent instance of received sensor data is repeated till a newer instance is available. For example, consider the video has frame rate of 25 frames per second. The position data 206 and orientation data 208 may have their own frequency. To simplify, let us consider the position data 206 may be of frequency 10 values of coordinates captured per second and orientation data 208 may be of frequency 10 values of angles per second. The frame rate of the video 204 needs to be mapped with frequency of position data 206 and orientation data 208. The 10 values of angles of a particular time needs to be synchronized with 25 frames captured at the same time frame. So, the 10 values are distributed across 25 image frames of the video recorded at the time when UAV was at that value of position and with that value of orientation. In another example embodiment, if the frequency of position data 206 is 1 coordinate value per second and orientation data 208 is of the frequency 1 angle value per second, the coordinate value and the angle value need to be replicated across 25 image frames, and the next angle value and the coordinate value to be synchronized with subsequent 25 image frames of the video 204 and so on.

Figure 4A:
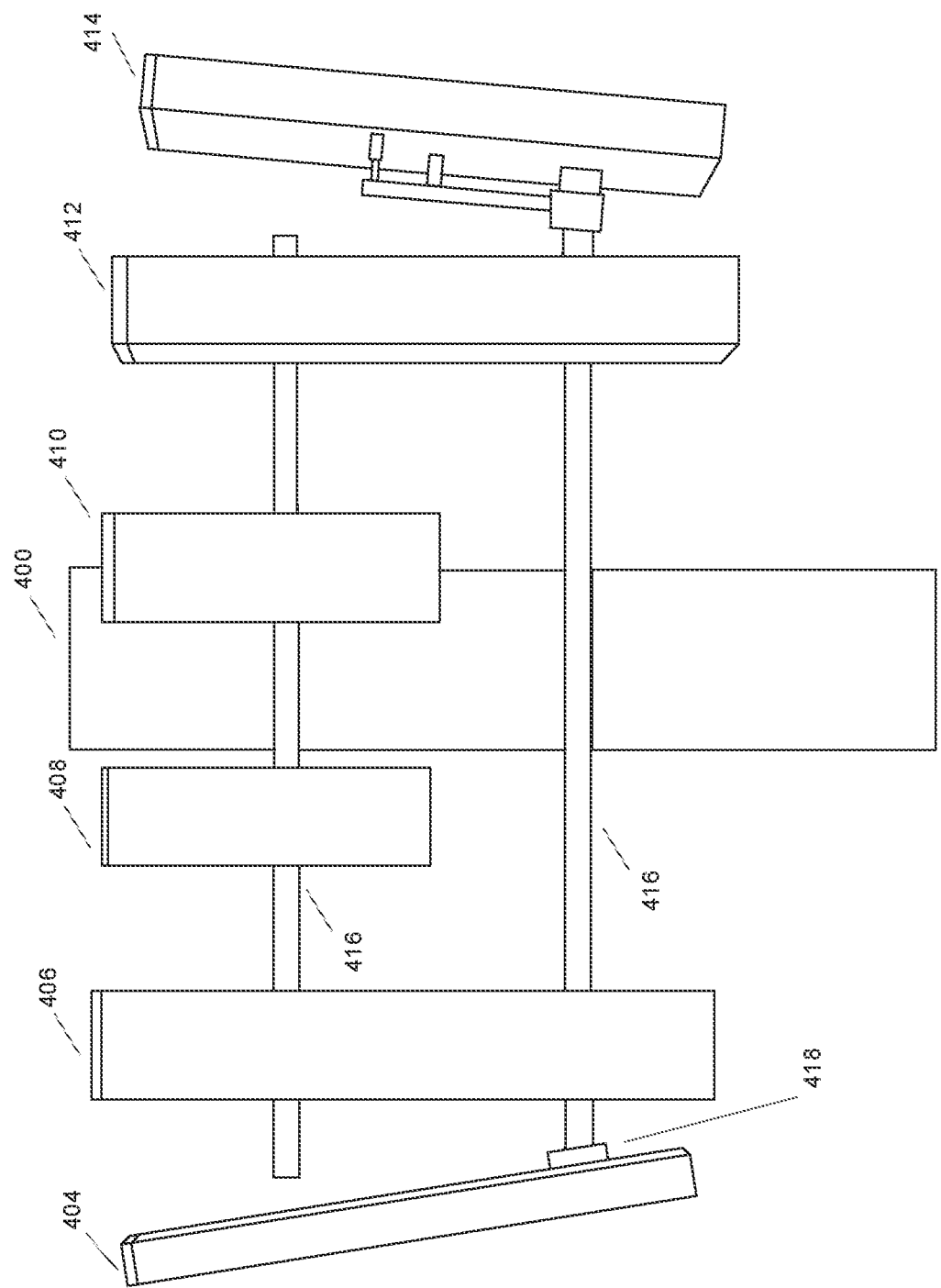
FIG. 4A illustrates a typical ROI (region of interest) extracted from an input image, according to one or more embodiments.
Figure 6A:
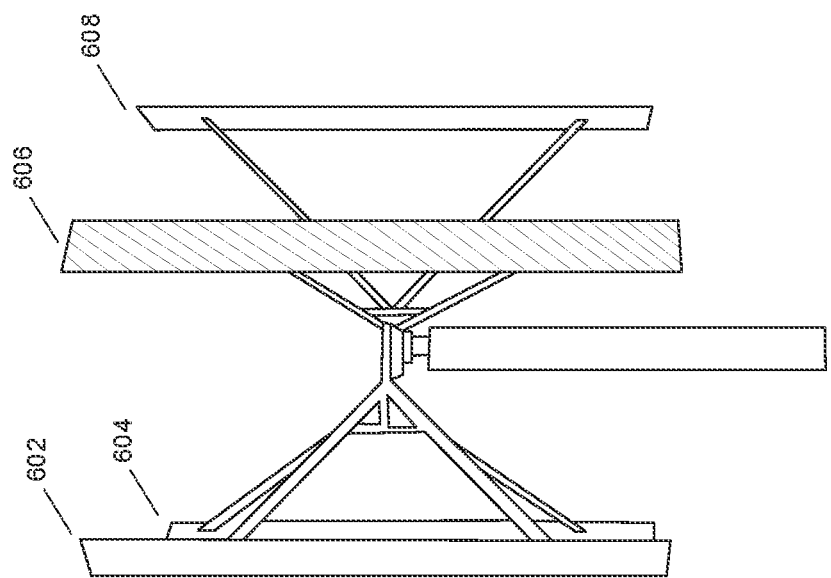
FIG. 6A illustrates a binary mask output of the object segmentation engine for one of the blades of the wind turbine, according to one or more embodiments.
Figure 6:
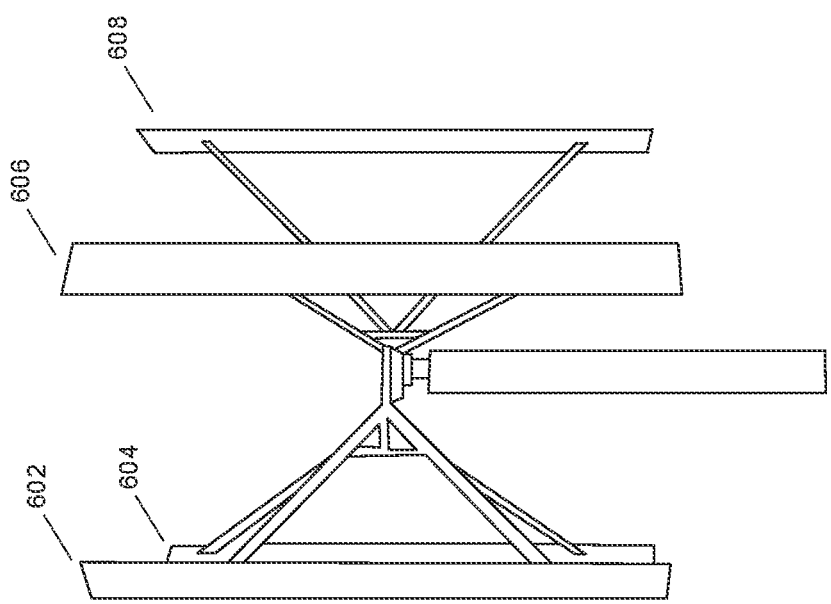
FIG. 6 illustrates input image of physical asset to be inspected along with the surrounding structures, according to one or more embodiments.
Figure 7:
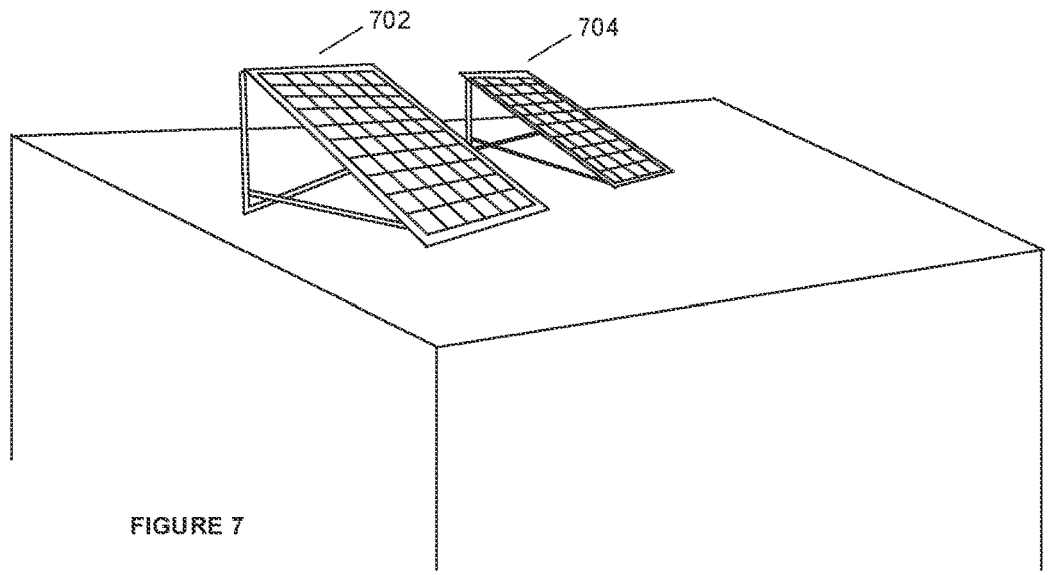
FIG. 7 illustrates input image of physical asset to be inspected along with the surrounding structures, according to one or more embodiments.

In one or more embodiments, the deep learning module may comprise the ROI detector 218 and the object segmentation engine 222. The ROI detector 218 may be a deep learning neural network model configured to perform object detection and may be trained using object detection training data 214. The object segmentation engine 222 may also be a deep learning neural network model configured to perform object segmentation and may be trained using object segmentation training data 216. In one or more embodiments, the object detection training data 214 may comprise set of images and the expected output (referred to as ground truth) which may be annotated by user as part of training ROI detector 218, wherein each image contains one or more assets which belong to the same category as the asset that is to be inspected. In an example embodiment, the asset to be inspected may be a telephone antenna as illustrated in FIG. 4 and FIG. 4A, in which case the training images will contain one or more telephone antennas along with other objects or background. It is preferred that the multiple images of the asset are captured from multiple view-points, in a varying light conditions and backgrounds. A user may prepare the ground truth labels indicating bounding box encompassing all the assets within each of the training images. The bounding box may be defined by co-ordinates that is center of the bounding box (x, y) along with width (w) and height (h) values in terms of pixel values. The labels may be stored in text format. The training images and their corresponding ground truth labels in the form of bounding boxes described by the numerical values (x, y, w, h) constitute a training data set for ROI detector 218, which may be stored in training data store 234. In another example embodiment, the asset to be inspected may be a vertical wind turbine as illustrated in FIG. 6. In yet another example embodiment, the asset to be inspected may be solar panel(s) as illustrated in FIG. 7.

Figure 7A:
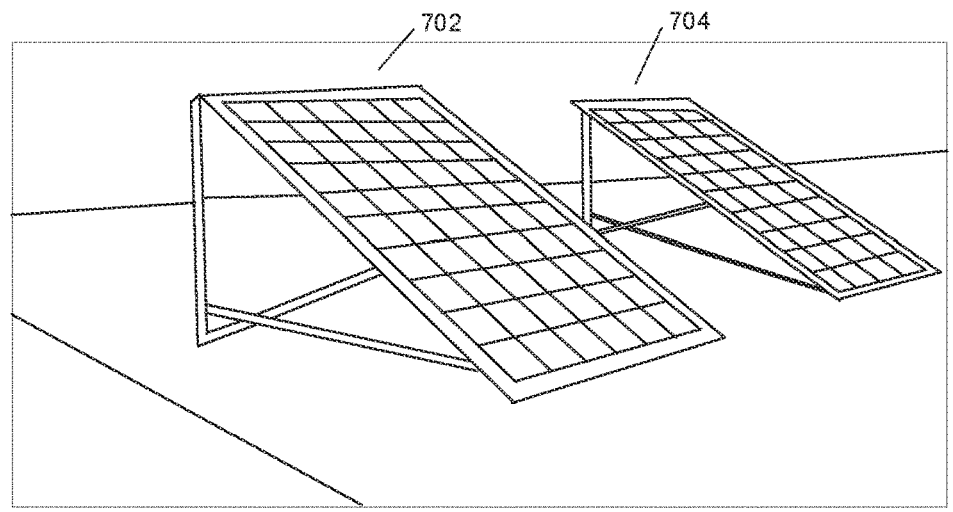
FIG. 7A illustrates typical ROI of physical asset to be inspected which is a solar panel, according to one or more embodiments.

The ROI detector 218 may be configured to receive plurality of images 204 along with the position data 206 and orientation data 208 from the data synchronization engine 210 and identify physical assets located in each of the plurality of images 204. The ROI detector may be configured to generate one or more image patches 220 from the plurality of images 204 by detecting a region or sub-section in each of the plurality of images which comprises one or more physical assets of interest that to be inspected. The ROI detector 218 may localize region of interest within each of the plurality of images 204 and generate bounding box in terms of coordinates in each of the plurality of images 204. The ROI detector 218 may use a Convolutional Neural Network (CNN) architecture (for example—Single Shot Detector (SSD) architecture) specifically designed for the task of object detection. The CNN layers extract visual features from the image to generate a feature map. At every position of the feature map, a bounding box (x, y, w, h) may be predicted along with an associated confidence score. The bounding box with the highest confidence score is retained as the output. The bounding box defined by the values (x, y, w, h) is the area within which one or more assets would be present. For convenience of operations, the bounding box's center (x, y), width (w) and height (h) are used to obtain the top-left corner co-ordinates (x1, y1) and bottom-right corner co-ordinates (x2, y2). Further, the remaining two corner coordinates the top-right corner (x2, y1) and the bottom-left corner (x1, y2) may be determined by the ROI detector 218. In this case, it can be said that the rectangle is defined by the four values (x, y, w, h). It is to be noted that irrespective of asset shape, the image patch (ROI) determined by the bounding box obtained from the first neural network is rectangle in shape and thus defined by the co-ordinates of the two corner points: (x1, y1, x2, y2). As illustrated in FIG. 7A, though the solar panels (702 and 704) are not in rectangular position from one of the viewpoints, the bounding boxes are rectangular in shape.

The bounding boxes generated by the ROI detector 218 may encompass all the assets present in each of the plurality of images 204 (there will be only one bounding box in each image regardless of number of assets in a particular image). The intention is to obtain the image patch containing the one or more assets and to remove surrounding objects/background as the full image will be large whereas the area of interest may be only a small part of the image depending on the distance between the UAV and the assets. Such bounding boxes may be referred as image patches 220. The image patches 220 of the plurality of images 220 in terms of coordinate values are communicated to the object segmentation engine 222, along with the associated position data 206 and orientation data 208 for each of the plurality of images 204.

In one or more embodiments, the object segmentation engine 222 may be configured to receive image patches 220 determined by the ROI detector as input and isolate instances of the physical assets in each of the plurality of images to generate binary masks 224. In one or more embodiments, the object segmentation training data 214 may comprise set of images, wherein each image contains one or more assets which belong to the same category as the asset that is to be inspected. The one or more assets within the image will almost span the entire width or height of the image with little to no excess space or no surrounding objects. A user may prepare the ground truth labels indicating pixel level boundary for the asset to be inspected. In case of object segmentation, the label is in the form of a binary mask image identical in dimensions to the training set image. For every pixel in the image that belongs to an asset, the corresponding pixel is given a value of 1, the remaining pixels are given the value 0. The training images and their corresponding ground truth labels in the form of binary masks constitute the training data set for object segmentation engine 222 which may be stored in training data store 234.

The object segmentation engine 222 may receive bounding box coordinates (image patches 220) of one or more instance of the physical asset in each of the plurality of images 204 and may generate one or more segmentation masks (also referred as binary masks) in each of the plurality of images 204. The object segmentation engine 222 may receive image patches 220 of the plurality of images 204 and may generate a probability map with the same dimensions as the image patches, i.e. every pixel in the image, there is one corresponding value in the probability map. The probability value may indicate the neural network's belief on whether the corresponding pixel is part of the asset or not. Ideally, all pixels belonging to the asset must have probability 1.0 while the remaining ones have probability 0.0. But the values may lie in between 0.0 and 1.0. A threshold (e.g. 0.8) may be set to create a binary mask. So, all pixels whose probability value >=0.8 would be given the value 1 while the remaining pixels having probability value <0.8 would be reduced to 0, wherein 1 indicates the pixel belongs to an asset while 0 indicates it is some other object or the background (non-presence of the asset).

Figure 7B:
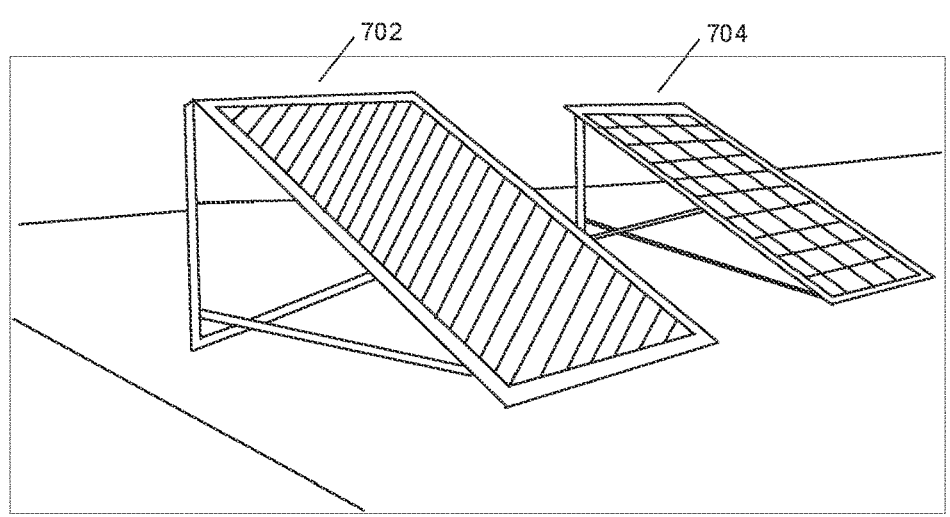
FIG. 7B illustrates a binary mask output of the object segmentation engine for one of the solar panels, according to one or more embodiments.

By applying the threshold, the object segmentation engine 222 may generate binary masks 204 for one or more instances of the physical asset in each of the plurality of images 204. Thus, a one or more binary mask (based on the number of assets) may be generated for each of the plurality of images 204, For example, if there is one physical asset in each of the plurality of images 204, there would be one binary mask in each of the plurality of images 204. If there are more than one physical assets in an image, the number of binary masks for that image may would be same as that of number of assets preset in the image. For example, if there are 6 assets in an image and there are 10 such images, there may be 6 binary masks representing the assets in each of the 10 images. In an example embodiment, the binary mask for the asset—telephone antenna is illustrated in FIG. 4B. In another example embodiment, FIG. 6A illustrates binary mask for the asset—vertical wind turbine which comprises blades 602, 604, 606 and 608, wherein segmentation mask is highlighted for 606 for illustration purpose. In yet another example embodiment, FIG. 7B illustrates binary mask for the asset—solar panel 702 and 704 wherein segmentation mask is highlighted for 702 for illustration purpose. As the position data 206 and orientation data 208 are also considered along with the images, the position data 206 and the orientation data 208 may still be associated with the binary masks 224 of the respective images in the plurality of images 204. The binary masks 224 may be stored as a single file represented as a byte string instead of individual image files. The file containing the byte string may be communicated to the computer vision module 226.

In one or more embodiments, the computer vision module 226 may comprise components such as, but not limited to an object tracker 228 and a 3D model generator 230. By approximating a rough motion trajectory of the UAV, the object tracker 228 may consider binary mask of the physical asset in the initial image, assign unique ID and may estimate the region of the image in the subsequent image where the binary mask of the same physical asset is present. By analyzing the trend in yaw values associated with each of the plurality of images (i.e. whether the yaw increasing or decreasing in a sequence of images), it is determined whether the UAV was moving in a clockwise direction around the assets or in an anticlockwise direction. Time taken for the yaw value to return to its original position (meaning the UAV has completed one revolution around the assets) may also be determined. Combining the 'time' information with other IMU data such as speed (and position if available), the system may calculate the circular distance travelled. Thus, a radius of the circular trajectory of the UAV may be estimated as UAV revolves around the assets. Putting it all together, the direction of the UAV motion (clockwise, anticlockwise), speed and approximate distance to the asset may be determined. If a binary mask is present in the vicinity of the expected region in the subsequent image, the object tracker 228 may assign the same unique ID. In case of multiple assets in the plurality of images 204, the object tracker 228 may assign a unique ID for each of the physical asset in the initial image and may estimate the region of the image in the subsequent image where the binary mask of the same physical asset is present. If a binary mask is present in the vicinity of the expected region in the subsequent image, the object tracker 228 may assign the same unique IDs of the respective binary masks. By perpetuating this logic across each image of the plurality of images 204 and repeating it for every asset, the object tracker 228 may track individual assets and distinctly identify them across plurality of images 204. In an example embodiment, each of the unique asset may be identified by assigning a color code and tracking them across the plurality of images 204.

In one or more embodiments, the object tracker 228 may be configured to perform look-ahead tracking mechanism, wherein instead of merely relying on forward motion to estimate the location of the binary mask in the next image/frame, a reverse motion may also be used in addition to forward motion by processing the images/frames in the reverse order. This may fill the missing gaps (if any) by leveraging the additional data points from the subsequent image/frames, by approximating the UAV motion trajectory. The tracked binary masks in each of the plurality of images 204 may be communicated to the 3D model generator 230.

In one or more embodiments, the 3D model generator may be configured to receive tracked binary masks 224 across plurality of images 204 and may be configured to generate a 3D model of the physical asset based on the position data 206 and orientation data 208 associated with each of the binary masks 224 and create a dense 3D point cloud model. The received binary masks 224 for the physical asset from each of the plurality of images 204 may be imported into a 3D space in the form of flat surface along the virtual vertical central axis located at the origin of the coordinate system [0,0,0]. The orientation data 208 may comprise the pitch angles, yaw angles and roll angles which together define the orientation of the camera/UAV at the time of image capture. From this set of values, the corresponding yaw angle may be used to rotate the binary mask by an angle equal to the yaw angle. The rotation angle may further be corrected using the FOV (Field of View) which is a camera parameter. The FOV (in degrees) is the extent of the observable world captured by the image capturing device within an image. There may be multiple assets at different locations within the same image, each asset having its own binary mask. The yaw angle is a single value associated with the entire image and using the same value for rotation of all the assets within the image might introduce small errors. Consider the width of the image to be 'w' and the distance in pixels between the center of the image and the center of a particular binary mask to be 'd'. The correction in the rotation angle is equal to d*fov/w. If the asset is located in the right half of the image, the correction angle is added to yaw angle otherwise the correction angle is subtracted from the yaw angle. The rotated mask is repositioned at a distance from the central point of a 3D space system such that a ray perpendicular to the length of the mask originating from the center of the mask and pointing towards the origin will make an angle with the X-axis equal to the angle by which the mask was rotated.

Once the mask has been rotated and repositioned, an inverse-projection from the 2D binary mask may be performed to generate a 3D volume towards and beyond the vertical central axis. The 3D volume may be represented by a mesh, which is a minimal set of vertices describing 3D shape of the projected volume. The inverse-projection process may be repeated for each mask associated with the physical asset in each of the plurality of images 204. In case of multiple physical assets i.e. multiple binary masks 224 in each image, the afore-mentioned process of inverse-projection may be performed for each of the multiple physical assets. In one or more embodiments, the position data 206 associated each of the plurality of images 204 may be used to estimate the geographical location of the physical asset. This can be used to integrate the estimated orientation information with Geographic Information System (GIS) tools and for visualizing the geographical locations of the physical assets at the site.

To generate a dense 3D point cloud representation of the physical asset, first, the volume of space, bound by all the 3D mesh structures may be populated with dense 3D points. A point cloud pruning process may be performed to retain only those points which are shared by all the 3D mesh structures. As a part of pruning process, each individual point may be evaluated by checking whether the point is within the bounds of all the 3D mesh structures or not. If yes, then the point is retained. If the point lies outside of at least one of the 3D mesh structures, then the point is removed. As a result, only those points which are a part of inverse-projections are retained. In other words, this is the common block of volume obtained from all mesh objects and is an accurate 3D point cloud model of the physical asset. The result may be the 3D mesh model which envelops the 3D point cloud within 3D mesh structure, representing the surface area of the physical asset. The 3D mesh model may be displayed at a display interface associated with the user device. The generated 3D point cloud model may be communicated to the 3D orientation estimation engine 232. The 3D orientation estimation engine 232 may receive the 3D model as input and may be configured to process using dimensionality reduction methods such as Principal Component Analysis (PCA) which may cause reducing the 3D Model to a set of 3 vectors defining the orientation of the asset with respect to the ground plane. The 3D model received as input by the 3D orientation estimation engine is a dense point cloud, which is nothing but a set of points in 3D space where each point is defined by its position (x, y, z). The set of 3D points may be provided as input to PCA algorithm to first reduce the 3-dimensional set of data to a single vector 504, which is the best representation of the entire data. Mathematically, this (vector 504) is the direction along which the variance of the data is maximum. Therefore, vector 504 lies along the length of the asset and may be considered as a major component vector. The angle measured between major component vector 504 and the vertical central axis gives the down-tilt (inclination angle) of the asset. This major component vector 504 is projected to the ground plane and the projection 510 gives the direction towards which the asset is inclined. The angled measured between projection 510 and the geographic north gives the azimuth of the asset. The down-tilt and azimuth together describe the orientation of the asset which may be displayed at the display interface associated with the client device either in a tabular format or graphical form. In case of multiple assets, the values of the azimuth and down-tilt may be displayed along with the unique ID assigned for each of the physical assets.

Figure 3:
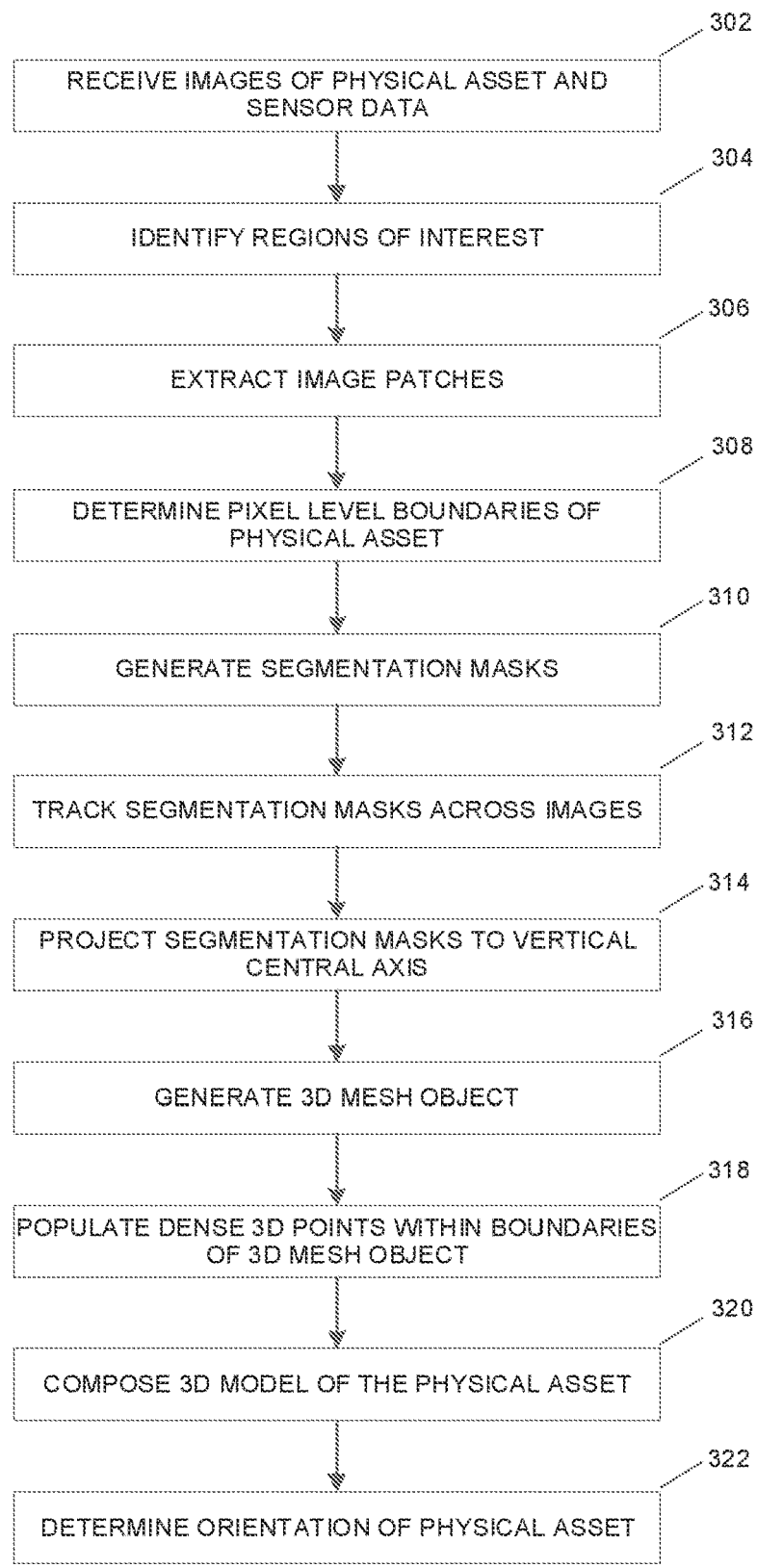
FIG. 3 is a process flow diagram illustrating steps perform by the system for automated estimation of 3D orientation of a physical asset, according to one or more embodiments.

FIG. 3 is a process flow diagram illustrating steps performed by the system for automated estimation of 3D orientation of a physical asset, according to one or more embodiments. In one or more embodiments, the method comprising, receiving plurality of images of a physical asset captured from multiple view angles using an image capturing device and sensor data of image capturing device associated with the plurality of images, as in step 302. The image capturing device may be mounted on an Unmanned Aerial Vehicle (UAV) and flown around the physical asset to capture images from multiple view angles. The multiple view angles during the image capture may cover all the sides of the physical asset from all possible directions. The sensor data may comprise at least one or combination of position data and orientation data of the image capturing device which are associated with the plurality of images during image capture. The position data and the orientation data may be obtained either from sensors associated with the image capturing device or sensors of the UAV or the combination thereof. The position data may indicate the geographical location information of either or both the image capturing device and UAV during the image capture which may be measured in terms of two co-ordinates—latitudes and longitudes. The orientation data may be an Inertial Measurement Unit (IMU) data associated with the UAV. The plurality of images that are captured using the image capturing device may be stored in a data store and may be fetched from the data store during the estimation of orientation of the physical asset.

In one or more embodiments, FIG. 4 illustrates an exemplary input image of physical asset which is a telecom tower 400 comprising multiple antennas to be inspected along with the surrounding structure 400A, 400B, 400C, and 400D. Multiple such images may be captured using image capturing device device/UAV which may be flown around the tower 400 to capture images from all possible angles and directions and may be stored in the data store. The plurality of images that are captured may be stored along with position data and orientation data as described in various embodiments of the present disclosure.

One or more segmentation masks of the physical asset in each of the plurality of images may be generated to isolate the physical asset in each of the plurality of images by extracting pixel level boundaries from regions of interest within each of the plurality of images by cascading results of two deep neural network models. To isolate physical asset in each image, one or more regions of interest which comprises the physical asset in the plurality of images may be identified using a first neural network model, as in step 304. The first neural network model may be a trained object detection model (ROI detector) to determine at least one region of interest in each of the plurality of images that comprises physical asset. In case of multiple physical assets to be isolated in each of the plurality of images, then there may be one region of interest which encompasses all the physical asset that is to be assessed. FIG. 4A illustrates a typical ROI (region of interest) extracted from an input image using the first deep neural network model (ROI detector), wherein the region of interest comprises only the portion of the image captured/received in which the physical asset (i.e., antennas in the present example) is present. In the present example embodiment, the ROI detector may be configured/trained to identify the antennas in the plurality of images and the result of detecting region of interest is illustrated in FIG. 4A wherein the tower and antennas portions of the input image is considered and the surrounding structures are removed/ignored from the input image. The ROI detector may be trained to identify any object such as solar panels, wind turbines etc. based on the training data set. In the present example embodiment, the ROI detected may be trained with numerous images of antenna and may be configured to identify portions in each of the plurality of images that consists telecom antenna. FIG. 4A illustrates identified region of interest from the input image. Apart from the physical asset i.e. antennas 404, 406, 408, 410, 412, and 414, the extracted image would contain the main tower body 404, antenna mounting base 416 and angular antenna mount 418. In the present example embodiment, the input image as represented in FIG. 4 may be one of the plurality of images and may be provided as input to the ROI detector. The image may be of resolution 624×350. The four coordinates in the image coordinate frame of reference may be identified from the ROI detector such as [168, 20], [420, 20], [168, 178], [420, 178]. The ROI image of size 252×168 extracted by using these four coordinate points as depicted in FIG. 4A. The identified ROI also referred as image patch in terms of bounding box coordinates in the identified region of interest may be extracted from each of the plurality of images, as in step 306 using the ROI detector and the extracted image patch in each of the plurality of images are communicated to a second deep neural network model.

The second neural network model (object segmentation engine) may be configured to determine pixel level boundaries of the physical asset in the extracted one or more image patches in the plurality of images, as in step 308. The second neural network model may be a trained object segmentation model. The determined pixel level boundaries may represent exact position of the physical asset in the plurality of images. The pixel level boundaries may be determined by calculating probability value corresponding to the pixel level boundaries along the bounding box coordinates. A threshold limit may be pre-defined by the user which may guide the object segmentation engine to either consider or reject the pixel(s) while determining whether the pixel(s) along the boundary box coordinates For example, if the threshold value is 0.8 then pixel with values 0.8 and above may be considered to be part of physical asset and the values below 0.8 may be ignored as it may have blurred edges or physical asset in that pixel may not be present in the region of interest (in which case the pixel value is 0). By applying the threshold, the object segmentation engine may generate one or more segmentation masks (also referred as 'binary masks' or '2D binary masks') for the pixel level boundaries of the extracted one or more image patches in the plurality of images, as in step 310. The output generated by the object segmentation engine is binary masks for each instance of physical asset in each of the plurality of images. FIG. 4B illustrates binary mask output of the object segmentation engine wherein the shaded region indicates the binary mask for the antenna 404 where the second neural network model (object segmentation engine) has identified a physical asset (antenna) within the region of interest. Similarly, the segmentation masks are generated for all the other antennas 404, 406, 408, 412, 414, 416 across each of the plurality of images.

The generated one or more segmentation masks are communicated to the object tracker associated with computer vision module. The generated one or more segmentation masks of the physical asset are tracked across the plurality of images using the object tacker, as in step 312. The object tracker may be configured to determine direction and speed of the UAV used to capture the plurality of images and may assign a unique ID to the physical asset present in the initial image. By approximating a rough motion trajectory of the UAV as described in earlier paragraphs, the object tracker may consider the segmentation mask of the physical asset in the initial image and may estimate the region of the image in the subsequent image where the segmentation mask of the same physical asset is present. If a segmentation mask is present in the vicinity of the expected region in the subsequent image, the object tracker may assign the same unique ID. This step of identifying the segmentation masks for physical asset of unique ID is repeated in each of the plurality of images so that the same physical asset is identified in each of the plurality of input images, thereby tracking the physical asses across plurality of images.

The tracked one or more segmentation masks generated from plurality of images may be received by a 3D model generator which may be configured to project the tracked one or more segmentation masks to a virtual vertical central axis, as in step 314. The direction of projecting each of the tracked one or more segmentation masks of the physical asset is determined based on the sensor data. The tracked one or more segmentation masks may represent the physical asset in each of the plurality of images from the respective angle from which each of the plurality of images are captured i.e. the yaw angle value recorded for respective images from which the binary masks are generated. The tracked one or more segmentation masks from different angles may be imported into a 3D space in the form of flat surface along the virtual vertical central axis located at the origin of the coordinate system [0,0,0]. The orientation data may comprise the pitch angles, yaw angles and roll angles which together define the orientation of the camera at the time of image capture. From this set of values, the corresponding yaw value may be used to rotate the segmentation mask by an angle equal to the yaw angle. The rotated mask is repositioned at a fixed distance from the vertical central axis such that the angle of the perpendicular distance from the center of the rotated binary mask to the vertical central axis passing through the origin is equal to the yaw angle.

Figure 5:
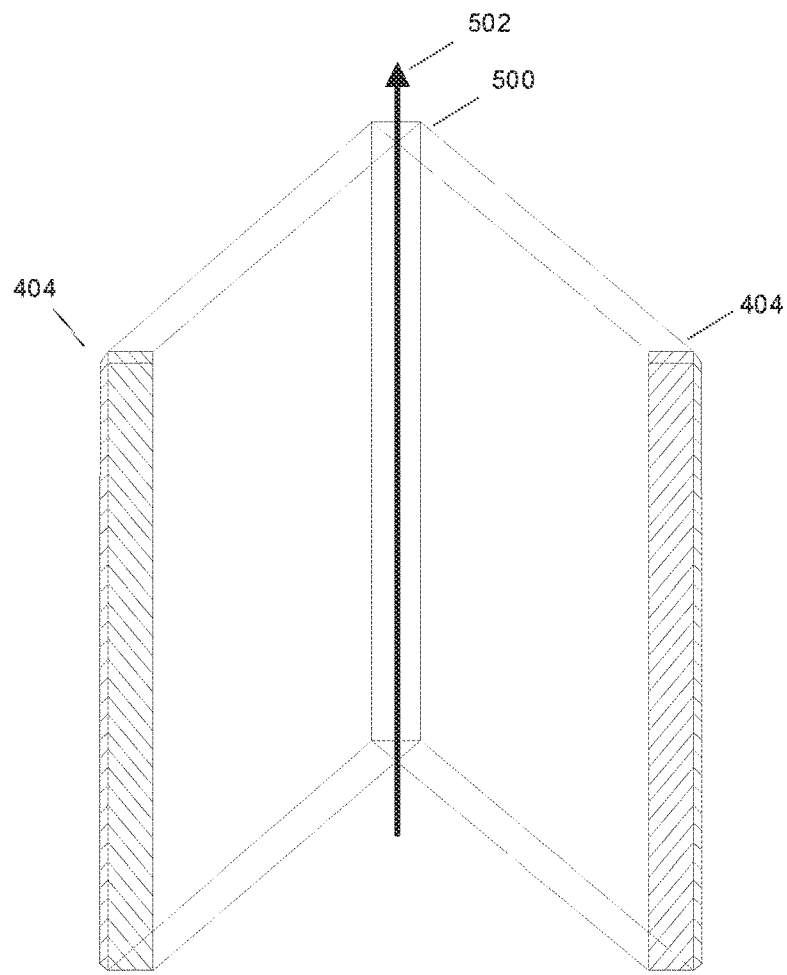
FIG. 5 illustrates an exemplary projection of 2D binary masks to compose a 3-dimensional model, as processed by the 3D model generator, according to one or more embodiments.
Figure 5A:
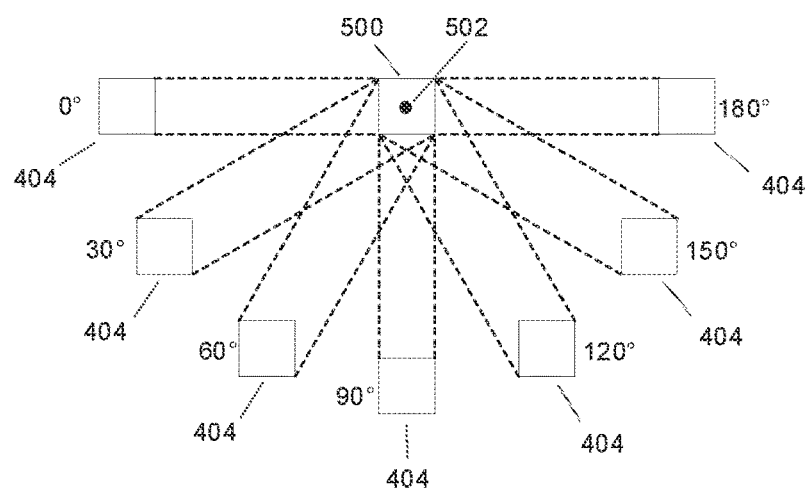
FIG. 5A illustrates an exemplary projection of 2D binary masks to compose a 3-dimensional model from top-view perspective, according to one or more embodiments.

After the one or more segmentation masks have been rotated and repositioned, an inverse-projection from the 2D binary mask may be performed to generate a 3D volume towards and beyond the vertical central axis. The 3D volume may be represented by a 3-dimenstional mesh object as in step 316, which is a minimal set of vertices describing 3D shape of the projected volume. The inverse-projection process may be repeated for each segmentation mask associated with the physical asset in each of the plurality of images. FIG. 5 illustrates an exemplary projection of 2D binary masks to compose a 3-dimensional model, as processed by the 3D model generator, wherein two binary masks of the antenna 404 are projected to the vertical central axis 502 to create the 3D model 500 of the physical asset, which is antenna 404 in the present example embodiment. The FIG. 5 illustrates only 2 binary masks of antenna 404 being projected, but in practice, it is preferred to have at least 18 binary masks for projection, 10 degrees apart in their corresponding yaw angle, covering a 180 degree wide arc to create the 3D model accurately. FIG. 5A illustrates an exemplary projection of 2D binary masks to compose a 3-dimensional model from top-view perspective, depicting how the contours of seven masks of antenna 404 are projected to create the 3D model 500 to form a common volume from all the projections to cover 180 degree arc viewpoint. It is to be observed that the projections at 0 degree and 180 degree are mirrored. If there was another projection at 210 degree, it would be the mirror to the projection at 30 degree and may not add any new information to the process, making it redundant. Hence the system may consider the projections from 0 degree to 180 degree and the remaining projections may me mirrored from existing projections.

The generated 3-dimensional mesh object bound by all the 3D mesh structures may be populated with dense 3-dimensional points within the boundaries as in step 318. A point cloud pruning process may be performed to retain only those points which are shared by all the 3D mesh structures. As a result, only those points which are a part of inverse-projections are retained and a 3-dimensional model of the physical asset may be composed/generated, as in step 320 and may be displayed at the display interface associated with the user device. The generated 3-dimensional model may be communicated to 3D orientation estimation engine which may be configured to determine orientation by computing cardinal axis of the 3-dimensional model, as in step 322. The 3D point cloud is processed by dimensionality reduction techniques such as Principal Component Analysis (PCA) which returns the vector that represents the maximum variance in the data i.e. it captures the maximum information from the 3D points and projects it onto a single vector which will be the major component vector and will be along the length of the asset.

Figure 5B:
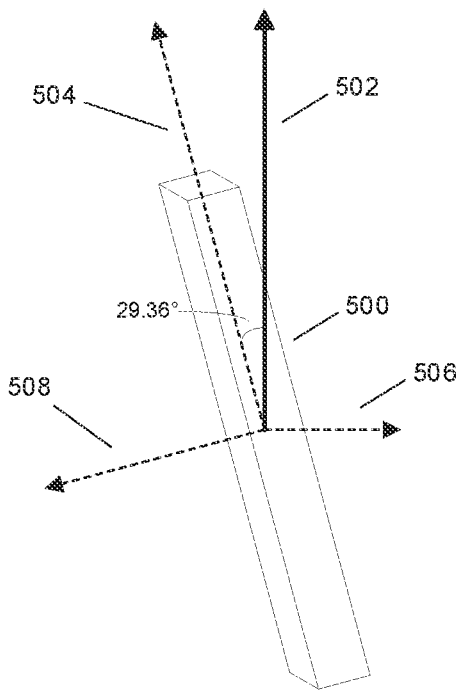
FIG. 5B illustrates orientation vectors obtained through processing a 3D point cloud by the 3D orientation estimation engine and the measured down-tilt angle, according to one or more embodiments.

FIG. 5B illustrates orientation vectors obtained through processing a 3D point cloud by the 3D orientation estimation engine 232 and the measured down-tilt angle. The FIG. 5B depicts three component vectors 504, 506, and 508 which define the orientation of the asset with respect to the three axes of rotation, similar to the pitch, yaw and roll of the camera-mounted UAV. The measured angle between the vertical central axis 502 and the major component vector 504 may represent the down-tilt angle of the antenna 404. This is a critical aspect of the orientation of the antenna 404.

Figure 5C:
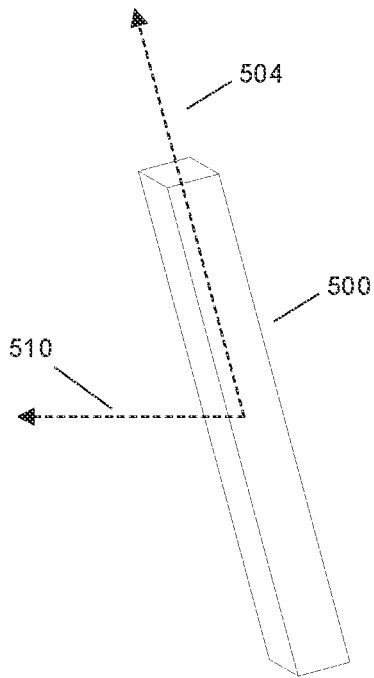
FIG. 5C illustrates projection of the major component vector of 3-dimensional model of the physical asset, according to one or more embodiments.

FIG. 5C illustrates projection of the major component vector 504 of 3-dimensional model of the physical asset and its projection vector along the ground plane 510. While the major component vector 504 measures the inclination or down-tilt of the antenna 404, the projection vector 510 along the ground plane indicates the direction in which the antenna 404 is pointed.

Figure 5D:
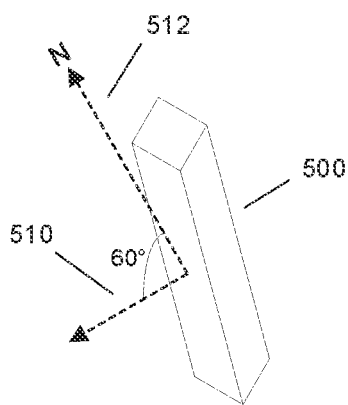
FIG. 5D illustrates projection of the major component vector and the measured azimuth angle of 3-dimensional model of the physical asset from a top-view perspective, according to one or more embodiments.

FIG. 5D illustrates projection of the major component vector 504 and the measured azimuth angle of 3-dimensional model of the antenna 404 from a top-view perspective, according to one or more embodiments. The orientation data provides yaw angle data with respect to the geographic north direction 512. The major component vector 504 and the subsequent projection vector 510 on the ground plane is derived from the same data and is thus measured with respect to the geographic north direction 512 which gives the azimuth of the antenna 404 This measured angle is the azimuth of the antenna 404. It is another critical and defining aspect of the orientation of the antenna 404. As per the convention, if the angle is measured counterclockwise, it is marked as a negative value.

In an example embodiment, consider that the major component vector (504) ($\vec{m}$) obtained through PCA is [12, 41, 21], implying the magnitude of the vector (|m|) in the x, y and z directions is 12, 41 and 21 respectively. The vertical central axis 502 is the y-axis and is represented by a vector (along the y-axis such as [0, 20, 0]. The angle between these two vectors ($\vec{y}$) is obtained through standard linear algebra models $$\theta = \cos^{-1} \frac{\vec{m} \cdot \vec{y}}{|m| \cdot |y|}$$

where $\vec{m}, \vec{y}$ is the dot product between the two vectors m and y, calculated by multiplying and summing the magnitude in each direction.

$$\vec{m}, \vec{y} = (12*0)+(41*20)+(21*0)) = 820$$

The magnitude |m| is given by $\sqrt{12^2+41^2+21^3}$=47.06 Similarly the magnitude |y|=20. Substituting these three values in the above formula, then $$\theta = \cos^{-1} \frac{820}{47.06*20} = 29.30°$$

This measured angle between the major component vector (504) $\vec{m}$ and the vertical central axis (502) $\vec{y}$ gives the inclination or down-tilt of the asset. The ground-projection vector (510) $\vec{g}$ is the projection of the major component vector (504) $\vec{m}$ on the ground plane. Thus, $\vec{g}$ has magnitude 0 along the y-axis and is given by [12, 0, 21]. By adopted convention, the North direction is along the x-axis and thus the vector 512 pointing in the North direction ($\vec{n}$) is given by [20, 0, 0]. By using the same linear algebra models described above, the angle between the vectors $\vec{g}$ and $\vec{n}$ may be determined. The determined orientation which is either or combination of inclination of the physical asset and azimuth of the physical asset may be displayed at the display interface associated with the client device either in a tabular format or graphical form. In case of multiple assets, the values of the azimuth and down-tilt may be displayed along with the unique ID assigned for each of the physical assets.

In one or more embodiments, the system/method for automated estimation of 3D orientation of a physical asset is disclosed wherein the 2D images of the physical asset captured by the image capturing device (camera) is synchronized with IMU sensor data so that for each image, the corresponding orientation and position of the UAV may be recorded for downstream analysis. Using prior data, two deep learning neural network models may be trained. One model may be trained to extract an image patch that is centered around the object of interest of the physical asset. In case multiple instances of the object are present in the image, the image patch encloses a cluster of instances. In case of multiple such groups of objects, the model may extract multiple image patches, each patch centered around a cluster of such objects. Another model may be trained to predict the pixel level boundary of each individual object which enables the distinct identification of each instance. The cascaded output of the two deep learning neural network model provides an estimation of where the object is located within each 2D images. By supplementing the output of the deep learning neural network models with the drone odometry data, the tracker may trace individual object instances across multiple images. By comparing the object from different views in different images, it is possible to filter out images where the object is occluded or not lit well enough (too dark or saturated). The best images are selected for orientation analysis. As a next step, pixel level boundaries of the object from different views are projected to create a 3D model. No prior assumptions are made about the shape of the object. The resultant 3D model output is used to determine the 3D orientation of the object with respect to the UAV camera. Then, the UAV odometry can be used to convert the 3D orientation of the object from the UAV frame of reference to the earth/ground frame of reference.

In one or more embodiments, a non-transitory computer readable storage medium for automated estimation of 3D orientation of a physical asset is disclosed. The non-transitory compute readable storage medium comprising machine executable code which when executed by at least one processor, causes the at least one processor to perform steps such as, receiving plurality of images of a physical asset captured from multiple view angles using an image capturing device and sensor data of image capturing device associated with the plurality of images. One or more image patches may be extracted from the plurality of images by identifying at least one region of interest from each of the plurality of images using a first neural network model. The first neural network model may be a trained object detection model. Pixel level boundaries of the physical asset may be determined in the extracted one or more image patches and one or more segmentation masks for the determined pixel level boundaries may be generated using a second neural network model. The second neural network model may be a trained object segmentation model. The extracted pixel level boundaries may represent the physical asset in the plurality of images.

The generated one or more segmentation masks of the physical asset are tracked across the plurality of images. A 3-dimensional model of the physical asset is composed by projecting the tracked one or more segmentation masks of the physical asset to a virtual central axis. The direction of projecting each of the tracked one or more segmentation masks of the physical asset is determined based on the sensor data. The sensor data may comprise at least one or combination of position data and orientation data of the image capturing device that are associated with the plurality of images during image capture. A 3-dimensional mesh object of the physical asset is generated based on the projection and then the generated 3-dimensional mesh object is populated with dense 3-dimensional points within the boundaries, to compose a 3-dimensional model of the physical asset. The orientation of the physical asset is determined by computing cardinal axis of the 3-dimensional model. The determined orientation is either or combination of inclination of the physical asset and azimuth of the physical asset.

The technology described in the preset disclosure eliminated the need of human intervention, guidance, or correction while assessing the orientation of any structural assets (physical assets). The disclosed system automatically analyzes the images of the assets and calculates the required 3D orientation estimates for each object. The system can be configured to provide further analysis based on the calculated 3D orientation, depending on the specific use case. The system provides accurate 3D orientation of physical asset/objects within a scene. This can directly be used by operators and engineers to determine the efficiency of their assets where knowledge of the 3D orientation is critical for operations such as the angle of solar panels for maximum energy generation and the down-tilt as well as azimuth of a telecom antenna for the most effective transmission and area coverage. The disclosed technology is less prone to errors caused due to sparsity of data in 3D modeling techniques like SfM (photogrammetry). If the generated SfM data is sparse, the orientation estimation largely suffers and in cases could be impossible to process. The disclosed technology circumvents this problem of sparsity of data point cloud. The system also leverages the UAV sensor information to boost accuracy and augment the information which could be derived from just images. By combining information from visual sensor (camera) and positioning sensors (UAV odometry) as described in various embodiments of the present disclosure, it is possible to generate the 3D orientation estimates more precisely.

The specification and drawings in the present disclosure are to be regarded in an illustrative rather than a restrictive sense.

What is claimed is:

1. A method for automated orientation estimation of a physical asset, comprising:
   receiving, by a processor, a plurality of images of a physical asset captured from multiple view angles using an image capturing device and sensor data about the image capturing device associated with and obtained during the capture of the plurality of images;
   generating, by the processor, one or more segmentation masks of the physical asset in each of the plurality of images, wherein each of the generated one or more segmentation masks in each image is indicative of each pixel in the image that belongs to the physical asset;
   tracking, by the processor, the generated one or more segmentation masks of the physical asset across the plurality of images;
   composing, by the processor, a 3-dimensional model of the physical asset based on the one or more segmentation masks tracked across the plurality of images; and
   determining, by the processor, the orientation of the physical asset by computing a cardinal axis of the 3-dimensional model, wherein the orientation is a combination of an inclination of the physical asset and an azimuth of the physical asset.

2. The method of claim 1, wherein the generation of the one or more segmentation masks of the physical asset further comprises:
   extracting, by the processor, one or more image patches by identifying at least one region of interest from each of the plurality of images, using a first neural network model;
   determining, by the processor, pixel level boundaries of the physical asset in the extracted one or more image patches using a second neural network model; and
   generating, by the processor, the one or more segmentation masks for the determined pixel level boundaries using the second neural network model.

3. The method of claim 1, wherein the composing of the 3-dimensional model representing the physical asset further comprises:
   projecting, by the processor, each of the tracked one or more segmentation masks of the physical asset to a virtual central axis;
   generating, by the processor, a 3-dimensional mesh object of the physical asset based on the projection; and
   populating, by the processor, dense 3-dimensional points within boundaries of the 3-dimensional mesh object to compose the 3-dimensional model of the physical asset.

4. The method of claim 3, wherein a direction of projection of each of the tracked one or more segmentation masks is determined based on the sensor data comprising position data and orientation data of the image capturing device, wherein the orientation data is indicative of a direction of capture of each of the plurality of images and includes values for yaw, pitch, and roll of the image capturing device for each of the multiple view angles.

5. The method of claim 1, further comprising:
   rotating, by the processor, each of the generated one or more segmentation masks by an angle based on the value of yaw associated with a corresponding image of the plurality of images; and
   correcting, by the processor, the angle of rotation of each of the generated one or more segmentation masks based on a field of view of the image capturing device, wherein the projection to the virtual central axis is based on the rotated one or more segmentation masks with the corrected angle of rotation.

6. The method of claim 1, further comprising:
   determining, by the processor, an approximate motion trajectory of the image capturing device based on position data and orientation data of the image capturing device; and
   estimating, by the processor, for each subsequent image following an initial image of the plurality of images, a region expected to include the physical asset, based on the approximate motion trajectory and the segmentation mask for the physical asset included in each prior image,
   wherein the tracking of the generated one or more segmentation masks across the plurality of images is based on the inclusion of the segmentation mask for each subsequent image being located in a vicinity of the estimated region for a corresponding image.

7. The method of claim 6, further comprising:
   processing, by the processor, the plurality of images in a reverse order following the capture of the plurality images; and
   estimating, by the processor, for each image captured prior to a last image of the plurality of images, the region expected to include the physical asset based on the processing of the plurality of images in the reverse order, the approximate motion trajectory of the image capturing device, and the segmentation mask for the physical asset included in each subsequent image, wherein the tracking of the generated one or more segmentation masks across the plurality of images is further based on the estimation of the region in each image expected to include physical image based on the processing of the images in the reverse order.

8. A system for automated orientation estimation of a physical asset, comprising:
   a processor;
   a memory unit operatively coupled to the processor, having instructions stored thereon that, when executed by the processor, causes the processor to:
   receive a plurality of images of a physical asset captured from multiple view angles using an image capturing device and sensor data about the image capturing device associated with and obtained during the capture of the plurality of images;
   generate one or more segmentation masks of the physical asset in each of the plurality of images, wherein each of the generated one or more segmentation masks in each image is indicative of each pixel in the image that belongs to the physical asset;
   track the generated one or more segmentation masks of the physical asset across the plurality of images;
   compose a 3-dimensional model of the physical asset based on the one or more segmentation masks tracked across the plurality of images; and
   determine the orientation of the physical asset by computing a cardinal axis of the 3-dimensional model, wherein the orientation is a combination of an inclination of the physical asset and an azimuth of the physical asset.

9. The system of claim 8, wherein for the generation of the one or more segmentation masks of the physical asset the instructions when executed by the processor, further cause the processor to:
   extract one or more image patches by identifying at least one region of interest from each of the plurality of images, using a first neural network model;
   determine pixel level boundaries of the of the physical asset in the extracted one or more image patches using a second neural network model; and
   generate the one or more segmentation masks for the determined pixel level boundaries using the second neural network model.

10. The system of claim 8, wherein for the composing of the 3-dimensional model representing the physical asset the instructions when executed by the processor, further cause the processor to:
   project each of the tracked one or more segmentation masks of the physical asset to a virtual central axis;
   generate a 3-dimensional mesh object of the physical asset based on the projection; and
   populate dense 3-dimensional points within boundaries of the 3-dimensional mesh object to compose the 3-dimensional model of the physical asset.

11. The system of claim 10, wherein a direction of projection of each of the tracked one or more segmentation masks is determined based on the sensor data comprising position data and orientation data of the image capturing device, wherein the orientation data is indicative of a direction of capture of each of the plurality of images and includes values of yaw, pitch, and roll of the image capturing device for each of the multiple view angles.

12. A non-transitory computer readable medium having stored thereon instructions for automated orientation estimation of a physical asset, the non-transitory computer readable medium comprising machine executable code which when executed by a processor, causes the processor to perform steps comprising:
   receiving a plurality of images of a physical asset captured from multiple view angles using an image capturing device and sensor data about the image capturing device associated with and obtained during the capture of the plurality of images;
   generating one or more segmentation masks of the physical asset in each of the plurality of images, wherein each of the generated one or more segmentation masks in each image is indicative of each pixel in the image that belongs to the physical asset;
   tracking the generated one or more segmentation masks of the physical asset across the plurality of images;
   composing a 3-dimensional model of the physical asset based on the one or more segmentation masks tracked across the plurality of images; and
   determining the orientation of the physical asset by computing a cardinal axis of the 3-dimensional model, wherein the orientation is a combination of an inclination of the physical asset and an azimuth of the physical asset.

13. The non-transitory computer readable medium of claim 12, wherein the generation of one or more segmentation masks of the physical asset further comprises:
   extracting one or more image patches by identifying at least one region of interest from each of the plurality of images, using a first neural network model;
   determining pixel level boundaries of the physical asset in the extracted one or more image patches using a second neural network model; and
   generating the one or more segmentation masks for determined the pixel level boundaries using the second neural network model.

14. The non-transitory computer readable medium of claim 12, wherein the composing of the 3-dimensional model representing the physical asset further comprises:
   projecting each of the tracked one or more segmentation masks of the physical asset to a virtual central axis;
   generating a 3-dimensional mesh object of the physical asset based on the projection; and
   populating dense 3-dimensional points within boundaries of the 3-dimensional mesh object to compose a 3-dimensional model of the physical asset.

15. The non-transitory computer readable medium of claim 14, wherein a direction of projection of each of the tracked one or more segmentation masks is determined based on the sensor data comprising position data and orientation data of the image capturing device, wherein the orientation data is indicative of a direction of capture of each of the plurality of images and includes values for yaw, pitch, and roll of the image capturing device for each of the multiple view angles.

* * * * *